US 6,736,379 B1
United States Patent
Wegner et al.

(10) Patent No.: US 6,736,379 B1
(45) Date of Patent: May 18, 2004

(54) DEVICE FOR GENERATING AN AEROSOL

(75) Inventors: Herbert Wegner, Ahaus (DE); Gottfried Kowalik, Gescher (DE)

(73) Assignee: GEA Finnah GmbH, Ahaus (DE)

( * ) Notice: Subject to any disclaimer, the term of this patent is extended or adjusted under 35 U.S.C. 154(b) by 0 days.

(21) Appl. No.: 09/806,216
(22) PCT Filed: Dec. 3, 1999
(86) PCT No.: PCT/EP99/09469
§ 371 (c)(1), (2), (4) Date: Apr. 25, 2001
(87) PCT Pub. No.: WO00/33967
PCT Pub. Date: Jun. 15, 2000

(30) Foreign Application Priority Data

Dec. 5, 1998 (DE) ...................... 298 21 687 U

(51) Int. Cl.$^7$ .................................. B01F 3/04
(52) U.S. Cl. ............. 261/127; 261/37; 261/53; 261/78.2; 261/116; 261/128
(58) Field of Search ............... 261/37.53, 76, 261/78.2, 116, 127, 128, DIG. 39, DIG. 65

(56) References Cited

U.S. PATENT DOCUMENTS

| 2,438,868 A | * | 3/1948 | Trier | 95/226 |
|---|---|---|---|---|
| 2,535,730 A | * | 12/1950 | Gadret | 423/204 |
| 2,859,155 A | * | 11/1958 | Cichelli et al. | 203/90 |
| 3,739,551 A | * | 6/1973 | Eckert | 95/211 |
| 4,068,802 A | * | 1/1978 | Goings | 239/419.5 |
| 4,919,853 A | * | 4/1990 | Alvarez et al. | 264/12 |
| 5,256,352 A | * | 10/1993 | Snyder et al. | 261/78.2 |
| 5,372,754 A | * | 12/1994 | Ono | 261/142 |
| 5,762,661 A | * | 6/1998 | Kleinberger et al. | 96/253 |
| 6,142,457 A | * | 11/2000 | Holtan et al. | 261/78.2 |

* cited by examiner

Primary Examiner—Scott Bushey
(74) Attorney, Agent, or Firm—Jordan and Hamburg LLP

(57) ABSTRACT

Apparatus for producing an aerosol including a gaseous component, especially air, such as sterile air, and a liquid component, especially a sterilizing agent such as peroxide. The apparatus includes an atomizing container in which the liquid component is atomized continuously and mixed with the current of gas which passes through the atomizing container. For this purpose, an atomizing nozzle for the liquid component of the aerosol is centrally arranged in the lower region of the atomizing container and a mechanism for forming an upwardly directed, bundled current of gas, which flows coaxially over the atomizing nozzle is arranged in front of the atomizing nozzle.

49 Claims, 2 Drawing Sheets

DEVICE FOR GENERATING AN AEROSOL

BACKGROUND OF THE INVENTION

Figure 1:
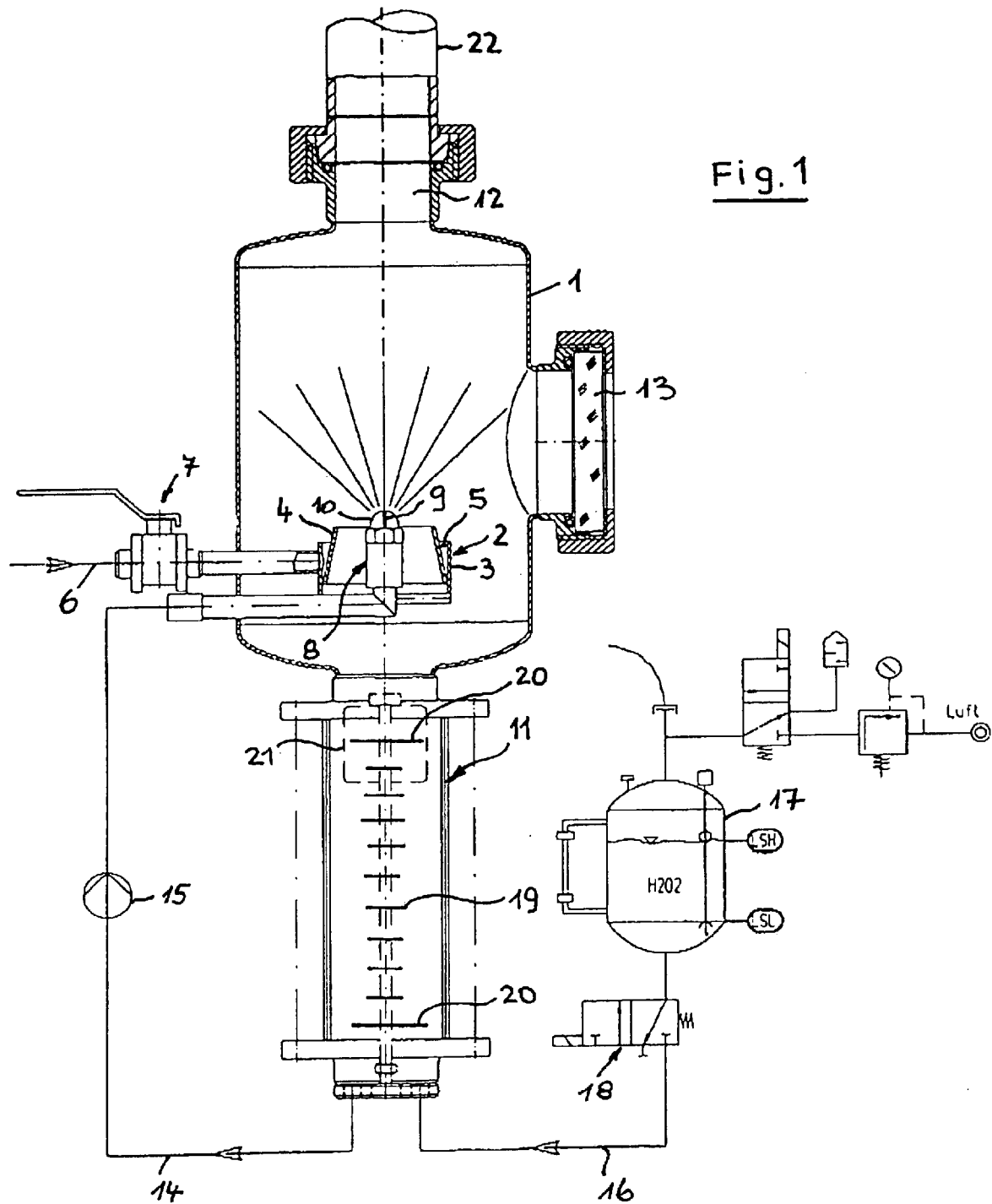

The invention relates to an apparatus for producing an aerosol.

The invention is concerned with the problem of creating an apparatus, which is constructed simply, has a high output and produces a particularly homogeneous aerosol.

SUMMARY OF THE INVENTION

The inventive apparatus, which is intended particularly for producing sterilizing and disinfecting aerosols, as used, for example, for the sterilization of packaging means, such as bottles, has a high output and produces a particularly homogeneous aerosol, which is free of droplets. If it exists, for example, of sterile air and peroxide, it has a high sterilizing and disinfecting power.

Further details and effects arise out of the following description and the drawing, in which diagrammatic examples of the inventive aerosol generator are illustrated.

IN THE DRAWINGS

Figure 2:
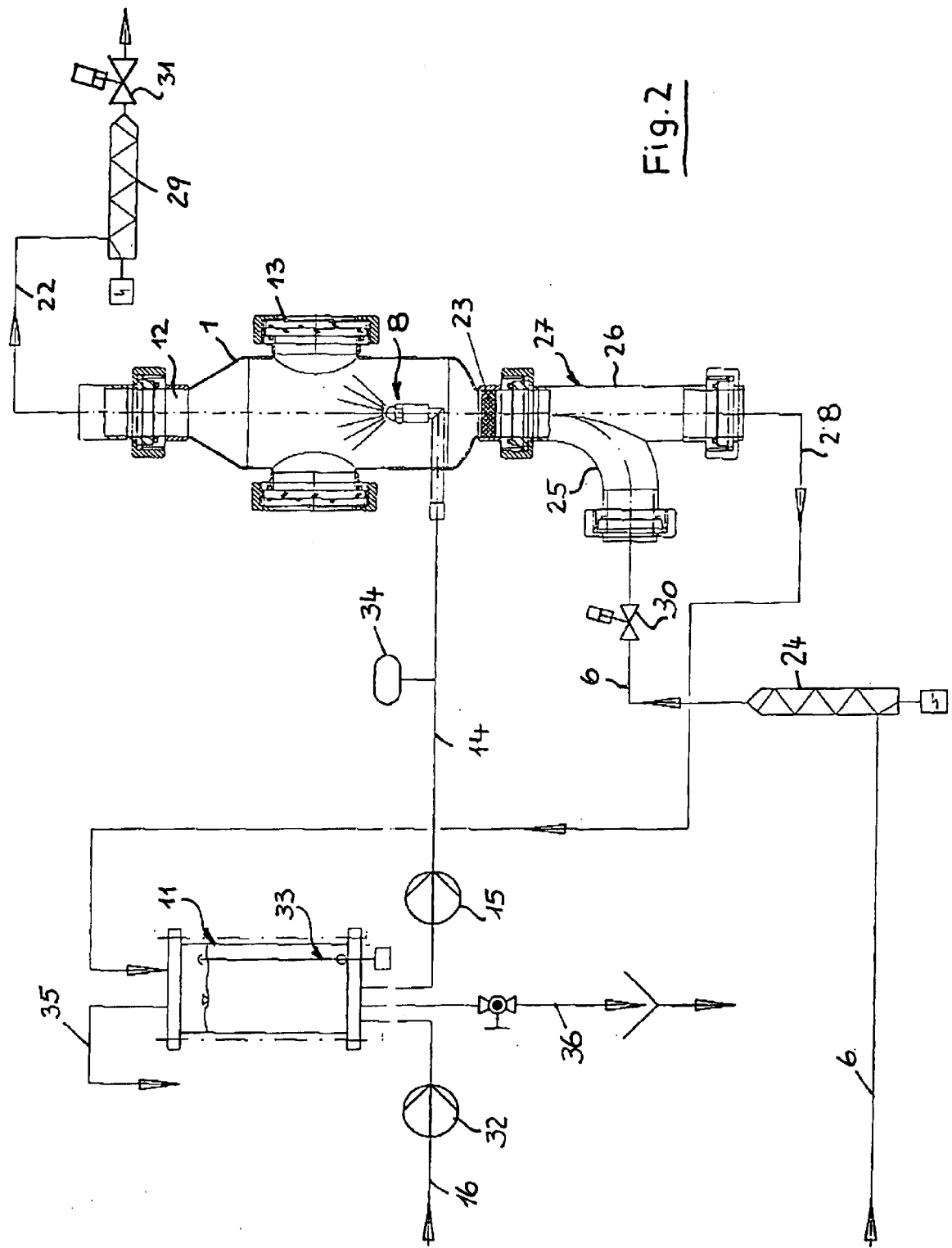

FIG. 1 shows a diagrammatic representation of a first embodiment of an inventive aerosol generator, and FIG. 2 shows a representation similar to that of FIG. 1, of a second embodiment of an inventive aerosol generator.

DESCRIPTION OF THE PREFERRED EMBODIMENTS

The apparatus, shown in FIG. 1, comprises an atomizing container 1, which has, in the lower region, an annular nozzle 2 as a means of forming an annular, bundled gas stream. The annular nozzle 2 has an outer cylindrical ring part 3 and an inner ring part 4, which is disposed in the outer, cylindrical ring part 3, has the shape of a circular conical section and, together with the outer ring part 3, forms the boundary of a nozzle duct 5, which expands in the upward direction and is closed at its underside. A pipeline 6 for supplying the gaseous component of the aerosol, which preferably consists of heated, sterile air, discharges into the nozzle duct 5. The temperature of the sterile air may be, for example, 60° to 80° C. A shut-off valve indicated at 7, preferably is a membrane valve opens up or shuts off the connection to a source of sterile air, which is not shown. It can be actuated manually or preferably by means of an actuator.

In the midst of the annular nozzle 2, an atomizing nozzle 8 is disposed for the liquid component of the aerosol, which preferably is hydrogen peroxide ($H_2O_2$). The atomizing nozzle 8 may be constructed as a wide slot nozzle and have a nozzle slot 9, which passes radially through a nozzle body 10 and is located approximately at the level of the upper edge of the inner ring part 4 of the annular nozzle 2. Instead, the atomizer nozzle may also have a normal construction with a nozzle duct, which is circular in cross section.

The atomizer container 1 has a basic cylindrical shape. In FIG. 1, the bottom of the atomizer container 1 changes over into the upper end of a measuring container 11 for the liquid component for the aerosol, so that the peroxide, depositing at the inside of the atomizing containing 1 due to condensation, can run back directly into the measuring container 11. At the lid side, the container 1 is provided with an outlet opening 12 for the aerosol produced. A discharging pipe line 22, leading to the place of use, can be connected to the outlet opening 12. An inspection opening, closed off by a sight glass 13, is provided in the side wall of the atomizing container 1.

A connecting line 14, in which a pump 15, preferably a membrane pump, is connected, comes out of the lower end of the measuring container 11. This connecting line 14 is passed through the side wall of the container into the atomizing container 1 and, at its end, carries the atomizing nozzle 8.

Furthermore, a connecting line 16, which connects the measuring container 11 to a (shown diagrammatically on a smaller scale) reservoir 17 for the liquid component of the aerosol discharges into the lower region of the measuring container 11. A valve 18 in the connection line 16 controls the flow into the measuring container 11. In the construction of FIG. 1, the latter has upper and lower limit contacts 20, which are disposed spaced apart above one another, as well as a float 21, which interacts with the limit contacts. The consumption of the liquid aerosol component is checked over the level contacts 19 with the help of the float 21 and the replacement of the liquid aerosol component over the supply valve 18 is controlled over the limit contacts 20.

While the apparatus is being operated, the annular nozzle 2 forms an annular, bundled, upwardly directed current of air, which takes up the mist-like aerosol component emerging from the atomizing nozzle 8 and mixes intimately with this component. The extremely homogeneous aerosol is practically free of droplets at the outlet. The output of the apparatus is high and an aerosol is produced which, when it consists of sterile air and peroxide, offers a high sterilizing and disinfecting effect.

In the construction of FIG. 2, the measuring container 11 is set up separately. The lower end of the atomizing container 1 is connected to the supplying pipeline 6 for the gaseous component and, as a means for forming a current of gas, comprises a number of screens, which are disposed one on top of the other and combined into a screen package 23. The individual screens preferably consist of an interwoven mesh of stainless steel wire. As it flows through the screen package 23, the current of gas experiences a cylindrical bundling and is also aligned coaxially to the atomizing nozzle 8, around which an extremely, uniform current of gas is flowing.

The supplying pipeline 6 for the gaseous component starts out from a reservoir, the details of which are not shown and the gaseous content of which, such as sterile air, may be under a specified pressure. On its way to the atomizing container 1, the gaseous component in the supplying pipeline 6 passes through a heating unit 24. The supplying pipeline 6 passes through an elbow 25 laterally into a straight part 26 of an approximately T-shaped connecting piece 27. Moreover, the supplying pipeline 26 is connected below the screen package coaxially to the lower end of the atomizing container 1 and is connected over a return pipeline 28 with the upper end of the separate measuring container 11 for the liquid component of the aerosol.

A heating unit 29 may also be connected in the discharging pipeline 22, which is connected to the upper end of the atomizing container 1, in order to ensure that the aerosol has the desired temperature when it reaches its place of use, such as a bottle sterilization station.

A shut-off valve 30, which can be actuated preferably by means of an actuator, is provided in the pipeline 6 for the gaseous component. There may also be such a shut-off valve 31 in the discharging pipeline 22 in front of or behind the heating unit 29.

At the bottom, the measuring container 11 is connected over the pipeline 16 to a reservoir for the liquid component of the aerosol which, in the case of the embodiment of FIG. 2, is pumped by means of a pump 32, as needed into the measuring container 11. In the case of the embodiment of FIG. 2, the measuring container 11 is provided with a capacitive probe 33, which controls re-filling of the measuring container 11, when an appropriate level is reached and, furthermore, enables the consumption of liquid aerosol component to be determined. An accurate determination of the consumption is provided by a flow meter 34, which is connected in the connecting pipeline 14. A venting pipeline is indicated at 35 and a valve-controlled pipeline 36 enables the measuring container 11 to be emptied completely.

When the apparatus is being operated, a droplet-free, fine, uniform aerosol is formed in the atomizing container 1 and can be supplied by the discharging pipeline 22 to the intended use and ensures that the surfaces, which are to be sterilized, are wetted completely there. A cycled aerosol formation process can be carried with the help of the shut-off valve 30. Such a process can also be carried out when the shut-off valve 30 is open and the shut-off valve 31 is opened and closed cyclically. Any condensate, which may have collected in the lower region of the pipeline section 26 is transferred in the latter cyclic operation over the return line 28 into the upper region of the measuring container 11 by the overpressure of the gaseous component in the system. In the event of a cyclic operation with the help of the shut-off valve 30, the measuring container 11 advisably is set up below the connecting part 27, so that the condensate can be returned through pipeline 28 by gravity without requiring a pump.

However, such a return of condensate need be carried out only rarely, since condensate of liquid aerosol components, in normal operation, drains from the atomizing container 1 into the screen package 23 where it is collected, dispersed, and taken up and carried along by the flow of the gaseous component, as soon as there is an appropriate flow.

In the case of a non-cyclic, continuous operation, the screen package 23 ensures that, as a rule, the entire condensate is retained in the region of the screen package 23, dispersed, and taken up by the gas stream and nothing goes over into the pipeline section 26, from where it would then be returned to the measuring container 11.

What is claimed is:

1. An apparatus for producing an aerosol consisting of a gaseous component and a liquid component with an atomizing container in which the liquid component is atomized continuously and mixed with the current of gas passing through the atomizing container to thereby form the aerosol, wherein an atomizing nozzle for the liquid component of the aerosol is disposed centrally in the lower region of the atomizing container, a lower end of the atomizing nozzle being connected to a supply pipeline for the gaseous component, and means for forming an upwardly directed, bundled current of gas, which flows coaxially over the atomizing nozzle, are disposed in front of the atomizing nozzle, the means for forming the bundled current including screens, which are disposed one above the other, enclosed in the lower end of the atomizing container.

2. The apparatus of claim 1, wherein the atomizing container has a generally cylindrical shape.

3. The apparatus of claim 1, wherein the screens are combined into a screen package.

4. The apparatus of claim 3, wherein the supply pipeline for the gaseous component discharges over an elbow laterally into a straight part of a pipeline of a connecting piece, which is connected below the screen package coaxially to the lower end of the atomizing container and, over a return line, with an upper end of a separately set up measuring container for the liquid component of the aerosol.

5. The apparatus of claims 1 or 3, wherein a heating unit is connected in the supply pipeline for the gaseous component.

6. The apparatus of claims 1 or 3, wherein a heating unit is connected in a discharging pipeline connected to an upper end of the atomizing container.

7. The apparatus of claims 1 or 3, wherein a shut-off valve, which is actuated by means of an actuator, is provided in the supply pipeline for the gaseous component.

8. The apparatus of claim 6, wherein a shut-off valve, which is actuated by means of an actuator, is provided in the discharging pipeline.

9. The apparatus of claims 1 or 3, wherein a connecting line, enclosing a pump, emerges from a lower end of a measuring container and is passed into the atomizing container and carries the atomizing nozzle at its end.

10. The apparatus of claim 9, wherein a flow meter is provided in the connecting line connecting the measuring container and the atomizing nozzle.

11. The apparatus of claim 10, wherein at least one inspection opening, closed off by a sight glass, is provided in a side wall of the atomizing container.

12. An apparatus for producing an aerosol from a gaseous component and a liquid component, comprising:

an atomizing container;

an atomizing nozzle arranged in said atomizing container to receive and atomize the liquid component;

flow forming means for receiving the gaseous component and forming a gaseous component flow around said atomizing nozzle such that the gaseous component flow mixes with the atomized liquid component to form the aerosol, the gaseous component flow being formed by said flow forming means coaxial to said atomizing nozzle; and a supply pipeline connected to said flow forming means for supplying the gaseous component to said flow forming means, said flow forming means comprising screens enclosed in a lower end of said atomizing container and arranged one above another.

13. The apparatus of claim 12, wherein said flow forming means are arranged behind said atomizing nozzle in a flow direction of the atomized liquid component.

14. The apparatus of claim 12, wherein said atomizing nozzle is arranged to direct the liquid component upward and said flow forming means are arranged to direct the gaseous component upward around said atomizing nozzle.

15. The apparatus of claim 12, wherein said atomizing container has a lower region, said atomizing nozzle being arranged in a central portion of said lower region of said atomizing container.

16. The apparatus of claim 12, wherein said atomizing nozzle comprises a spherical nozzle body having a nozzle slot passing radially through said nozzle body.

17. The apparatus of claim 12, wherein said atomizing container has a cylindrical shape.

18. The apparatus of claim 12, wherein said screens are combined into a screen package.

19. The apparatus of claim 12, wherein said supply pipeline includes a connecting piece including an elbow part through which the gaseous component is passed into said atomizing container and a straight part arranged below said screens.

20. The apparatus of claim 19, further comprising:
a measuring container for containing the liquid component, the liquid component being supplied from said measuring container to said atomizing nozzle; and
a return line connecting said connecting piece to said measuring container.

21. The apparatus of claim 12, further comprising a heating unit arranged in connection with said supply pipeline for heating the gaseous component in said supply pipeline.

22. The apparatus of claim 12, further comprising a shut-off valve arranged in connection with said supply pipeline, said shut-off valve being adapted to be actuated by an actuator.

23. The apparatus of claim 12, further comprising:
a discharge pipeline connected to an upper end of said atomizing container through which the aerosol exits from said atomizing container; and
a heating unit arranged in connection with said discharge pipeline for heating the aerosol in said discharge pipeline.

24. The apparatus of claim 23, further comprising a shut-off valve arranged in connection with said discharge pipeline, said shut-off valve being adapted to be actuated by an actuator.

25. The apparatus of claim 12, further comprising:
a measuring container for containing the liquid component;
a connecting line leading from said measuring container to said atomizing nozzle through which liquid is directed from said measuring container to said atomizing nozzle, said atomizing nozzle being arranged at an end of said connecting line; and
a pump arranged in connection with said connecting line.

26. The apparatus of claim 12, further comprising:
a measuring container for containing the liquid component;
a pipeline connecting said measuring container and said atomizing nozzle, the liquid component being supplied from said measuring container to said atomizing nozzle through said pipeline; and
a flow meter arranged in connection with said pipeline.

27. The apparatus of claim 12, wherein said atomizing container has a side wall including at least one inspection opening, the apparatus further comprising a sight glass for closing each of said at least one inspection opening.

28. A method for producing an aerosol from a gaseous component and a liquid component, comprising the steps of:
arranging an atomizing nozzle in an atomizing container;
directing the liquid component to the atomizing nozzle such that the liquid component is atomized by the atomizing nozzle; and
forming a flow of the gaseous component around the atomizing nozzle such that the gaseous component flow mixes with the atomized liquid component to form the aerosol, the gaseous component flow being formed coaxial to the atomizing nozzle;
the step of forming the gaseous component flow comprising the steps of forming the gaseous component flow by means of screens arranged behind the atomizing nozzle and directing the gaseous component through the screens in a direction toward the atomizing nozzle.

29. The method of claim 28, wherein the step of forming the gaseous component flow comprises the step of forming the gaseous component flow behind the atomizing nozzle in a flow direction of the atomized liquid component.

30. The method of claim 28, further comprising the steps of:
maintaining an amount of the liquid component in a measuring container; and
supplying the liquid component from the measuring container to the atomizing nozzle.

31. The method of claim 28, further comprising the step of heating the gaseous component prior to forming of the gaseous component flow.

32. The method of claim 28, further comprising the steps of:
discharging the aerosol formed in the atomizing chamber through a discharge pipeline connected to an upper end of the atomizing container; and
heating the aerosol in the discharge pipeline.

33. The apparatus of claim 1, further comprising heating means for heating the gaseous component prior to mixing with the liquid component in the atomizing container.

34. The apparatus of claim 33, wherein the heating means comprise a heating unit arranged in connection with the supply pipeline such that the gaseous component is heated in the supply pipeline.

35. The apparatus of claim 1, further comprising heating means for heating the aerosol.

36. The apparatus of claim 35, further comprising a discharge pipeline connected to an upper end of the atomizing container through which the aerosol exits from the atomizing container, the heating means comprising a heating unit arranged in connection with the discharge pipeline for heating the aerosol in the discharge pipeline.

37. The apparatus of claim 12, further comprising heating means for heating the gaseous component prior to mixing with the liquid component in said atomizing container.

38. The apparatus of claim 37, wherein said heating means comprise a heating unit arranged in connection with said supply pipeline such that the gaseous component is heated in said supply pipeline.

39. The apparatus of claim 12, further comprising heating means for heating the aerosol.

40. The apparatus of claim 39, further comprising a discharge pipeline connected to an upper end of said atomizing container through which the aerosol exits from said atomizing container, said heating means comprising a heating unit arranged in connection with said discharge pipeline for heating the aerosol in said discharge pipeline.

41. The method of claim 28, further comprising the step of heating the gaseous component prior to mixing with the liquid component in the atomizing container.

42. The method of claim 41, wherein the step of heating the gaseous component comprises the step of arranging a heating unit in connection with a supply pipeline through which the gaseous component flows prior to the atomizing container such that the gaseous component is heated in the supply pipeline.

43. The method of claim 28, further comprising the step of heating the aerosol.

44. The method of claim 43, wherein the step of heating the aerosol comprises the step of arranging a heating unit in a discharge pipeline connected to an upper end of the atomizing container and through which the aerosol exits from the atomizing container.

45. An apparatus for producing an aerosol including a gaseous component and a liquid component with an atomizing container in which the liquid component is atomized continuously and mixed with the current of gas passing through the atomizing container, wherein
an atomizing nozzle for the liquid component of the aerosol is disposed centrally in the lower region of the atomizing container, means for forming an upwardly directed, bundled current of gas, which flows coaxially over the atomizing nozzle, are disposed in front of the atomizing nozzle, and a connecting line, enclosing a pump, emerges from a lower end of a measuring container and is passed into the atomizing container and carries the atomizing nozzle at its end.

46. The apparatus of claim 45, wherein a flow meter is provided in the connecting line connecting the measuring container and the atomizing nozzle.

47. The apparatus of claim 45, wherein at least one inspection opening, closed off by a sight glass, is provided in a side wall of the atomizing container.

48. An apparatus for producing an aerosol from a gaseous component and a liquid component, comprising:

an atomizing container;

an atomizing nozzle arranged in said atomizing container to receive and atomize the liquid component;

flow forming means for receiving the gaseous component and forming a gaseous component flow around said atomizing nozzle such that the gaseous component flow mixes with the atomized liquid component, the gaseous component flow being formed by said flow forming means coaxial to said atomizing nozzle;

a measuring container for containing the liquid component;

a connecting line leading from said measuring container to said atomizing nozzle through which liquid is directed from said measuring container to said atomizing nozzle, said atomizing nozzle being arranged at an end of said connecting line; and a pump arranged in connection with said connecting line.

49. An apparatus for producing an aerosol from a gaseous component and a liquid component, comprising:

an atomizing container having a side wall including at least one inspection opening;

an atomizing nozzle arranged in said atomizing container to receive and atomize the liquid component;

flow forming means for receiving the gaseous component and forming a gaseous component flow around said atomizing nozzle such that the gaseous component flow mixes with the atomized liquid component, the gaseous component flow being formed by said flow forming means coaxial to said atomizing nozzle; and a sight glass for closing each of said at least one inspection opening.

* * * * *